No. 12,260. REISSUED AUG. 23, 1904.

J. B. BOOS.

SAFE.

APPLICATION FILED APR. 21, 1903.

2 SHEETS—SHEET 1.

Witnesses:
Chas. E. Taylor,
Geo. Herron

Inventor:
Joseph B. Boos,
By Dyrenforth, Dyrenforth & Lee,
Attys.

No. 12,260. REISSUED AUG. 23, 1904.

J. B. BOOS.

SAFE.

APPLICATION FILED APR. 21, 1903.

2 SHEETS—SHEET 2.

Witnesses:
Chas. C. Gaylord.
Geo. C. Maguire.

Inventor:
Joseph B. Boos,
By Dyrenforth, Dyrenforth & Lee,
Attys.

No. 12,260. Reissued August 23, 1904.

UNITED STATES PATENT OFFICE.

JOSEPH B. BOOS, OF MUSCATINE, IOWA.

SAFE.

SPECIFICATION forming part of Reissued Letters Patent No. 12,260, dated August 23, 1904.

Original No. 695,191, dated March 11, 1902. Application for reissue filed April 21, 1903. Serial No. 153,720.

*To all whom it may concern:*

Be it known that I, JOSEPH B. BOOS, a citizen of the United States, residing at Muscatine, in the county of Muscatine, State of Iowa, have invented certain new and useful Improvements in Safes, of which the following is a specification.

My invention relates, more particularly stated, to safe-doors of the variety known as "screw-doors," "plug-doors," and the like.

Heretofore safes have not been supplied with an outer door and also with an inner door adapted for opening and closing it when the outer door is open to be moved bodily through the outer door-opening. Rectangular doors have been applied to bank-safes in many instances and arranged one inside and one outside on ordinary hinges; but this of course is impossible with doors of the variety to which my improvement relates, as the inner door could not open far enough to provide a suitable passage-way on account of the nature of the opening for the outer door.

My object is to provide a safe with an inner and an outer door of the variety referred to and to provide means for moving the inner door bodily through the outer door-opening and supporting it when open outside of the safe, and a further object is to provide means of simple, durable, and inexpensive construction which may be moved to a position to engage the inner door when the outer door is open and then to withdraw the inner door outwardly through the opening of the outer door, and, finally, move it to a position outside of the safe, and also capable of returning the door to its locked position, and then of being removed from the opening of the outer door.

My invention consists, essentially, in the construction, arrangement, and combination with a safe having inner and outer door openings at its front of a door for the outer opening and a door for the inner opening adapted to be moved for opening and closing it bodily through the opening for the outer door; and it also consists of means for manipulating the inner door whereby the objects contemplated are attained, as hereinafter more fully set forth, pointed out in my claims, and illustrated in the accompanying drawings, in which—

Figure 1:
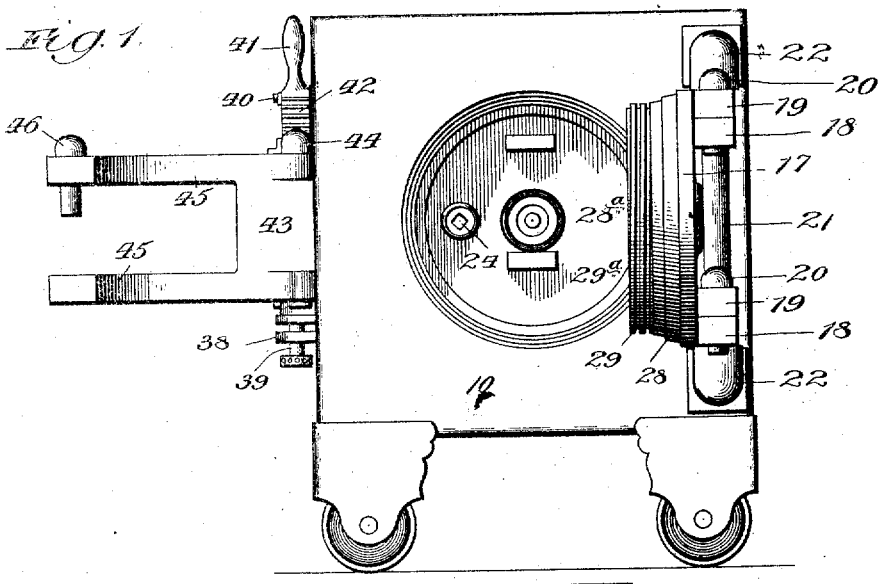
Figure 2:
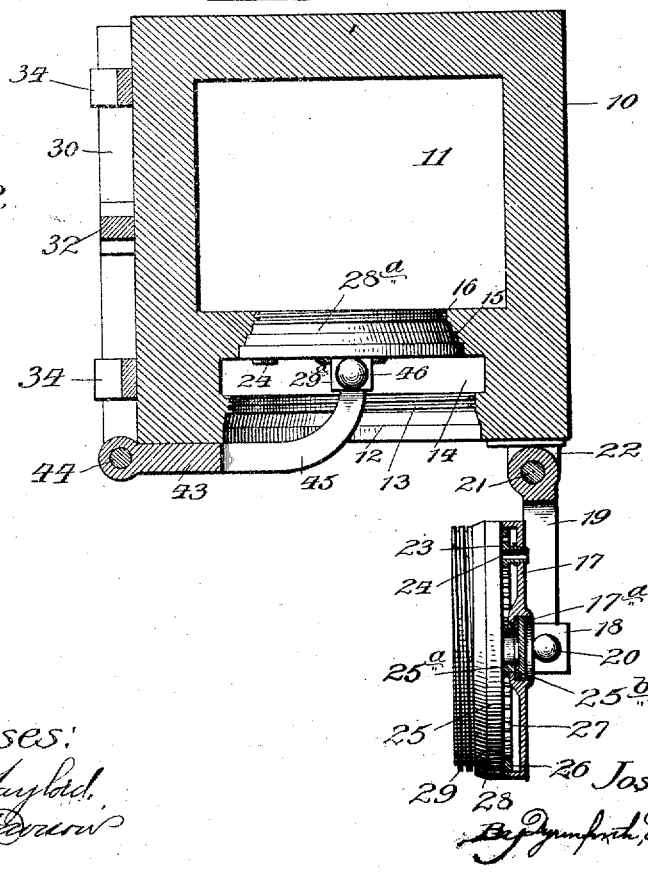
Figure 3:
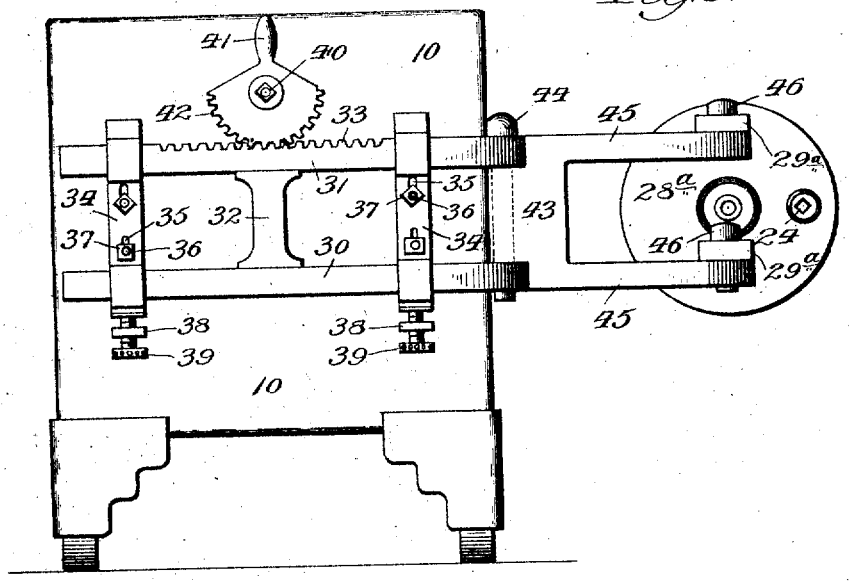
Figure 4:
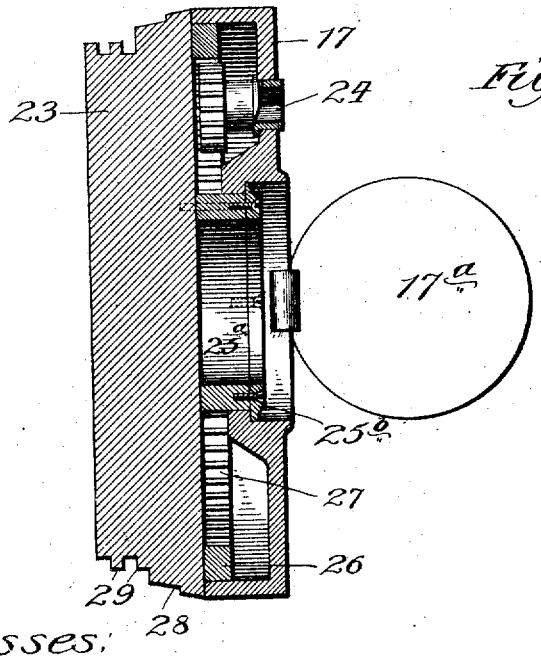

Figure 1 shows a front elevation of my improved safe with the outer door supported upon its hinges and in an open position and the inner door closed and detached from its supporting mechanism. Fig. 2 shows a horizontal sectional view of the complete device, the parts being in the same position as shown in Fig. 1, except that the mechanism for handling the inner door in shown in position in engagement with the inner door. Fig. 3 shows a side elevation of the complete safe, showing preferred means for handling the inner door, also showing the inner door detached from the safe and supported in a position in front of the safe. Fig. 4 shows an enlarged vertical central sectional view of the outer safe-door, showing the small central door thereof in its open position.

To illustrate my invention, I have shown it in the drawings as applied to the "screw" variety of safe-door, and the description hereinafter contained is confined to its application to that particular variety. My invention is, however, equally applicable to the "plug" variety and the like of safe-doors and is intended to include the same, as also such changes from the particular details of construction and combinations of parts shown, and hereinafter described, as will not constitute a departure from the principle of the invention.

Referring to the accompanying drawings, I have used the reference-numeral 10 to indicate the safe proper, the chamber of which is indicated by the reference-numeral 11. The front wall of the safe is made considerably thicker than the other walls, and the front is provided with a circular opening having a stepped beveled surface 12 and a screw-threaded surface 13 in the rear thereof. Behind the screw-threaded opening 13 is a chamber 14, and in the rear of this chamber is a circular opening concentric with the aforesaid opening, but of smaller diameter, and provided with a stepped surface 15 and a screw-threaded surface 16 in the rear thereof.

To close the front opening, I have provided a door having at its outer surface a plate 17, provided with lugs 18, projecting outwardly from its outer face and designed to be engaged by the arms 19 and connected therewith by means of the pins 20, said arms 19 being hinged to the pintle 21, which is supported in the lugs 22 on the side of the safe front. By this means the plate 17 may freely swing from the front of the safe in a semicircle, and the plate 17 may also move relative to the arms 19. Rotatably mounted on the plate 17 is a pinion 23, having an angular central opening 24 for purposes hereinafter made clear. At the central portion of the plate 17 is a small hinged door 17[a], covering an opening in the plate 17. In the rear of the plate 17 is the safe-door proper, (indicated by the reference-numeral 25.) This door is rotatably mounted on the plate 17 by having an annular ring 25[a] on its front surface projected through the opening in the plate 17, and a ring 25[b] is placed against the front of the plate 17 and screwed to the ring 25[a]. Hence the plate 17 and door 25 are rotatably connected. The door 25 is provided on its front face with a rim 26, having internal cog-teeth 27, which are meshed with the pinion 23. Hence when said pinion is rotated the door proper is turned relative to the front 17. On the periphery of the door adjacent to the front is a stepped surface 28 to accurately fit into the stepped surface 12 in the front opening in the safe, and in the rear of the stepped surface 28 is a screw-threaded surface 29 to engage and coact with the screw-threaded surface 13.

The parts just described are all of the same general construction as the screw-door safes now in common use, and in operation the door is swung on its supporting-arms until the screw-threaded portion thereof engages the screw portion 13 of the opening. Then the operator places a crank having an angular projection into the angular opening 24 of the pinion, and obviously upon rotation of the crank the safe-door is turned and tightly screwed into the opening in front of the safe, where it is locked by any suitable locking device.

It is obvious, of course, that the door for closing the inner opening cannot be swung upon hinges supported between the inner and outer door, and I have provided the following means for manipulating this inner door. The said inner door is constructed exactly the same as the outer door, except that it is smaller, and I have indicated the entire door by the reference-numeral 28[a]. On the front of said door are the perforated lugs 29[a]. On one of the sides of the safe are two parallel bars 30 and 31, connected by means of the cross-brace 32. The upper bar is provided with cog-teeth 33 at its top, and both bars are slidingly mounted in the guides 34, so as to be capable of horizontal movement. These guides 34 are slotted at 35, and bolts 36 are passed through the slots into the safe and provided with nuts 37 on their outer ends to engage the outer surfaces of the guides, thereby providing for limited and adjustable movement of the guides. Beneath each guide is a lug 38, fixed to the safe, and a set-screw 39 is passed through said lug to engage the under surface of the guide 34, by which the accurate vertical adjustment of the guides may be attained. In adjusting said guides the nuts 37 are loosened, then the set-screw 39 manipulated until the proper position is attained, and then the nuts 37 are tightened. Above the upper bar 31 is a journal 40, fixed to the safe, and fulcrumed upon the journal 40 is a lever 41, having a toothed segment 42 on its lower end meshed with the teeth 33 in the bar 31. By this means it is obvious that a movement of the lever 41 will slide the bars 30 and 31 both forwardly and rearwardly.

Mounted between the forward ends of the bars 30 and 31 is a frame 43, pivotally connected with the bars 30 and 31 by means of the pintle 44, and projecting horizontally from the frame 43 are the curved arms 45, said arms being designed to move to a position in engagement with the lugs 29[a] when the inner door is in its locked position. The said arms are connected with the lugs 29[a] by means of the detachable pins 46. In practical use with this portion of the device and assuming the parts to be in the position shown in Fig. 2, and assuming, further, that it is desired to remove the inner door, the door is first unscrewed in the manner hereinbefore indicated in connection with the outer door. Then the handle of the lever 41 is moved rearwardly, thereby moving the bars 30 and 31, the arms 45, and the inner door all forwardly until the inner door clears the front of the safe. Then the operator grasps the arms 45 and swings them to position with the outer door adjacent to the side of the safe. Then the handle of the lever 41 is moved forwardly and the frame 43 and arms 45 and the inner door are all moved to a position away from the front of the safe. In replacing the safe-door the bars 30 and 31 are projected in advance of the safe. Then the door is swung on its hinges to a position where it will enter the opening in the safe. Then the bars 30 and 31 are moved rearwardly until the inner door is in position to be screwed tight. After this is done the pins 46 are detached and the arms 45 are swung outwardly, and then the outer door may freely close in the ordinary way. It is well known that safe-doors of this class are quite heavy and, further, that the door must exactly register with the opening in which it belongs. There is, of course, a probability that the inner door will sag after considerable use. Hence the means for vertically adjusting the guides have been provided to compensate for this sag.

Having thus described my invention, what

I claim, and desire to secure by Letters Patent of the United States therefor, is—

1. A safe comprising, in combination, a single section forming the storage-compartment, having in its face an outer door-opening and an inner door-opening, a door for said inner opening bodily movable, for closing and opening it, through said outer opening, and a solid door for said outer opening hinged directly to said section, substantially as described.

2. A safe comprising, in combination, a single section forming the storage-compartment, having in its face an outer door-opening and an inner door-opening, a door for said inner opening bodily movable, for closing and opening it, through said outer opening, a movable support outside the safe for said inner door, adapted to be detachably connected therewith and affording means for moving it through said outer opening and a solid door for said outer opening hinged directly to said section, substantially as described.

3. A safe comprising, in combination, a single section forming the storage-compartment, having in its face an outer door-opening and an inner door-opening, a door for said inner opening bodily movable, for closing and opening it, through said outer opening, an arm detachably connected with said inner door and pivotally connected with said section, and a solid door for said outer opening hinged directly to said section, substantially as described.

4. A safe comprising, in combination, a single section forming the storage-compartment, having in its face an outer door-opening and an inner door-opening, a door for said inner opening bodily movable, for closing and opening it, through said outer opening, an arm detachably connected with the inner door and pivotally and slidingly connected with said section, and a solid door for said outer opening hinged directly to said section, substantially as described.

5. The combination, in a safe, of an outer door-opening and an inner door-opening, a solid door for said outer opening hinged to the safe, a door for said inner opening bodily movable, for closing and opening it, through said outer opening, a support reciprocably and adjustably secured on the safe, an arm pivotally connected at one end with said support and detachably connected at its opposite end with said inner door, and means for reciprocating said support.

6. The combination with a safe having openings to receive an inner and outer screw-door, of a screw-door for the outer opening hinged to the safe, a screw-door for the inner opening and arms detachably connected with the inner screw-door and pivotally connected with the safe.

7. The combination with a safe having openings to receive an inner and an outer screw-door, of a screw-door for the outer opening hinged to the safe, a screw-door for the inner opening and arms detachably connected with the inner screw-door and pivotally and slidingly connected with the safe.

8. The combination with a safe having openings to receive an inner and outer screw-door, of an inner screw-door, of bars slidingly supported at one side of the safe, means for moving said bars forwardly and backwardly in a horizontal plane, a frame hinged to said bars and of such shape as to be capable of engaging the inner door when it is in position, and means for detachably connecting the said frame with the inner door.

9. The combination with a safe having openings to receive an inner and outer screw-door, of a screw-door for the outer opening hinged to the front of the safe, a screw-door for the inner opening having perforated lugs on its outer face, bars slidingly supported at one side of the safe to be capable of movement in a horizontal plane, guides for slidingly supporting said bars capable of vertical adjustment, means for adjusting said guides vertically, a frame having curved arms pivoted to the forward ends of the bars and detachably connected with the inner screw-door, means for moving the sliding bars forwardly and rearwardly, substantially as and for the purposes stated.

JOSEPH B. BOOS.

In presence of—
J. G. KAMMERER,
I. M. KAMMERER.